United States Patent [19]

Lewis

[11] 4,171,881
[45] Oct. 23, 1979

[54] HAND HELD MOTION PICTURE VIEWER
[75] Inventor: Alan G. Lewis, West Linn, Oreg.
[73] Assignee: GAF Corporation, New York, N.Y.
[21] Appl. No.: 873,710
[22] Filed: Jan. 30, 1978
[51] Int. Cl.² ............................................. G03B 21/00
[52] U.S. Cl. ....................................... 352/72; 352/166;
352/189; 352/190; 352/140
[58] Field of Search .................. 352/129, 166, 72, 189,
352/190, 184, 139, 140

[56] References Cited
U.S. PATENT DOCUMENTS

| 3,139,790 | 7/1964 | Kipping | 352/183 |
| 3,476,470 | 11/1969 | Dejoux | 352/129 |

FOREIGN PATENT DOCUMENTS 2604770 8/1977 Fed. Rep. of Germany.
2604771 8/1977 Fed. Rep. of Germany.

*Primary Examiner*—Monroe H. Hayes
*Attorney, Agent, or Firm*—Walter C. Kehm; J. Gary Mohr

[57] ABSTRACT

A hand held motion picture viewer includes a housing having a recess formed in one end of the housing for carrying a film cartridge, and a viewing aperture in the opposite end of the housing through which the images on the film in the cartridge may be viewed. The housing carries a film driving mechanism for engaging and advancing the film within the cartridge past the viewing aperture. The film driving mechanism includes a battery operated motor, a claw journaled for rotation within the housing and positioned to engage sprocket holes in the film when the cartridge is carried within the recess of the viewer, and a gear transmission means connected between the motor and the claw for rotating the claw in discrete arcuate steps when the motor is energized to produce intermittent film advance. An actuating lever and movable contact means are provided for selective electrical connection of the motor with the battery for selective energization of the motor and film advance. A mechanical claw advancing mechanism is coupled with the actuating lever to mechanically drive the claw through a short angular distance to overcome inertia of the film when energization of the motor is commenced with the claw positioned within a sprocket hole.

18 Claims, 22 Drawing Figures

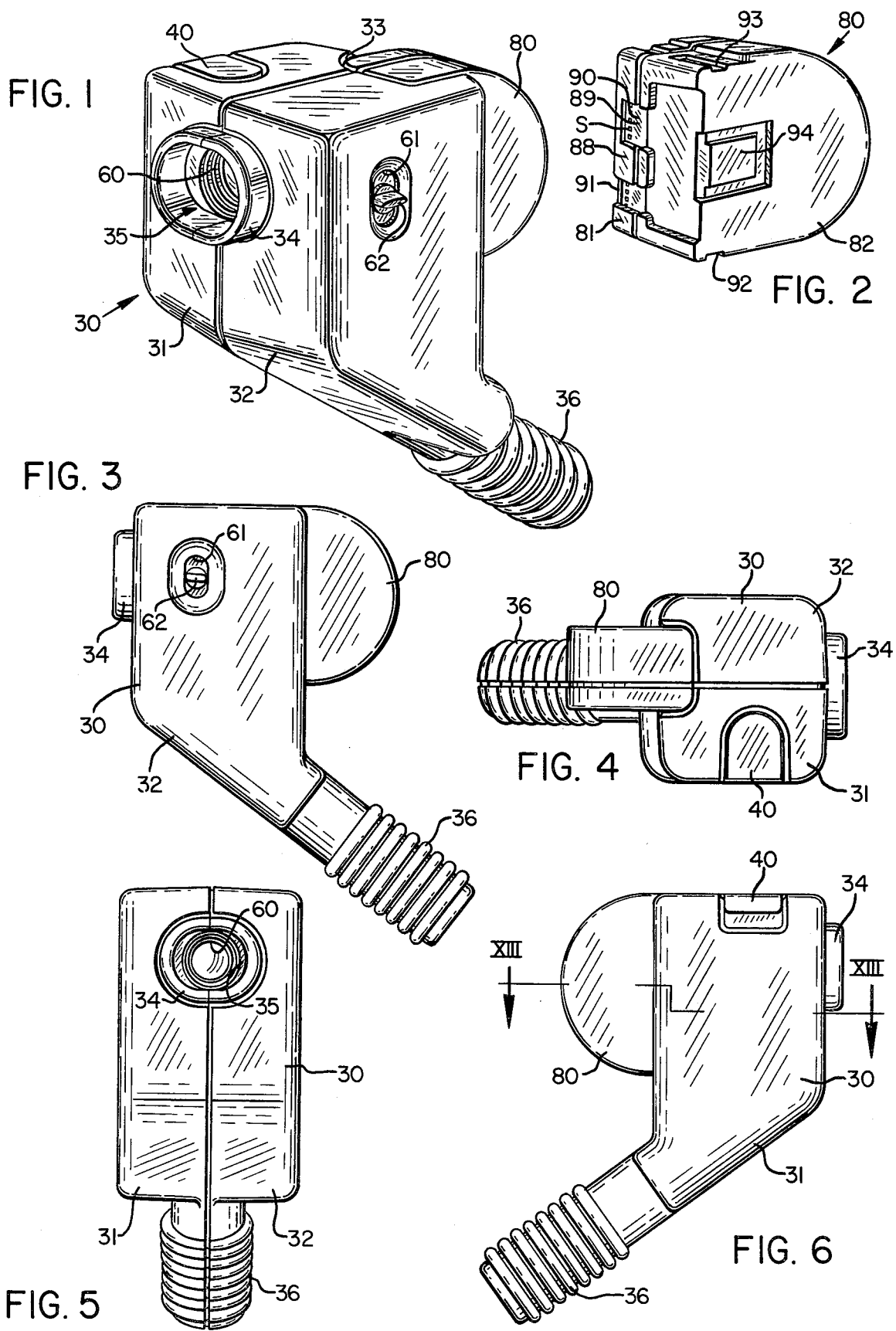

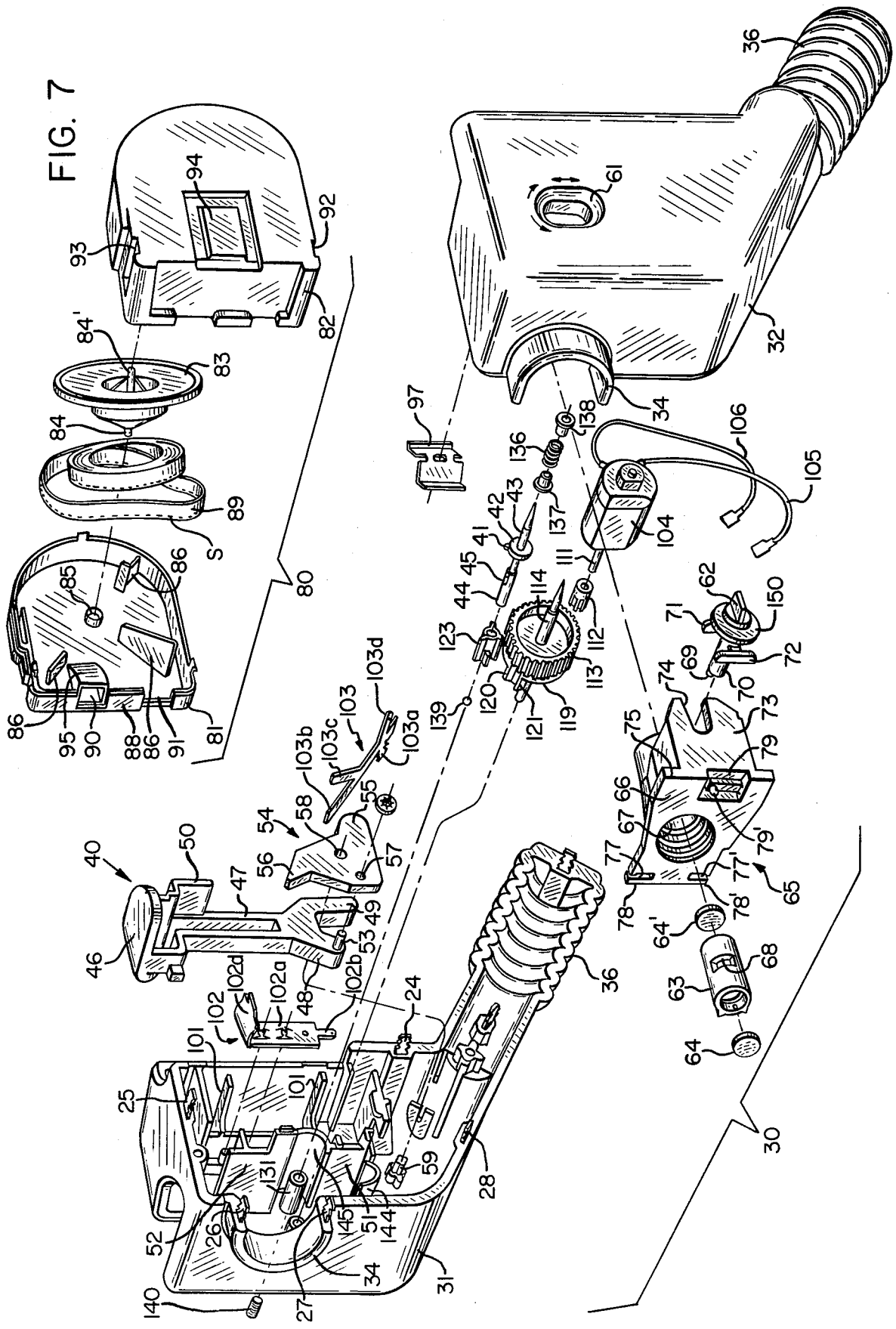

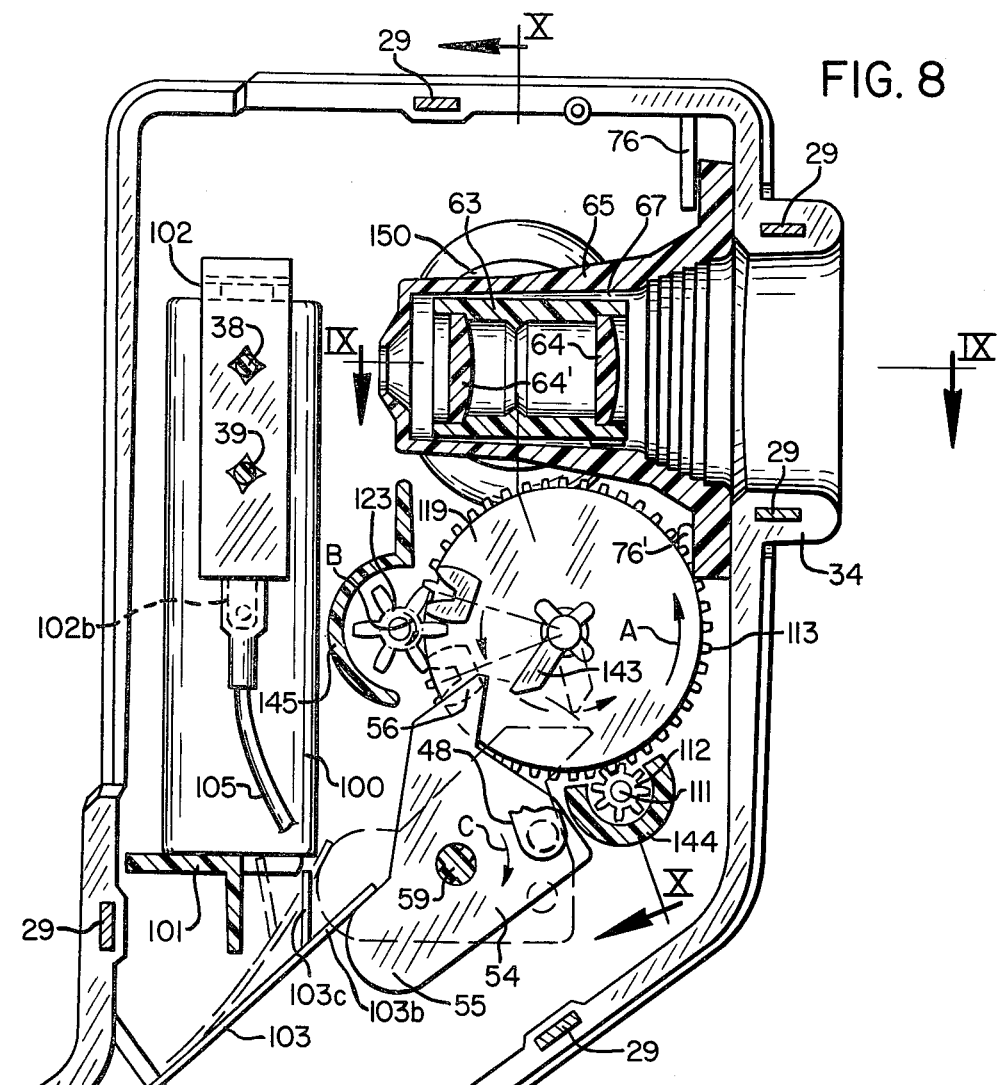
FIG. 8
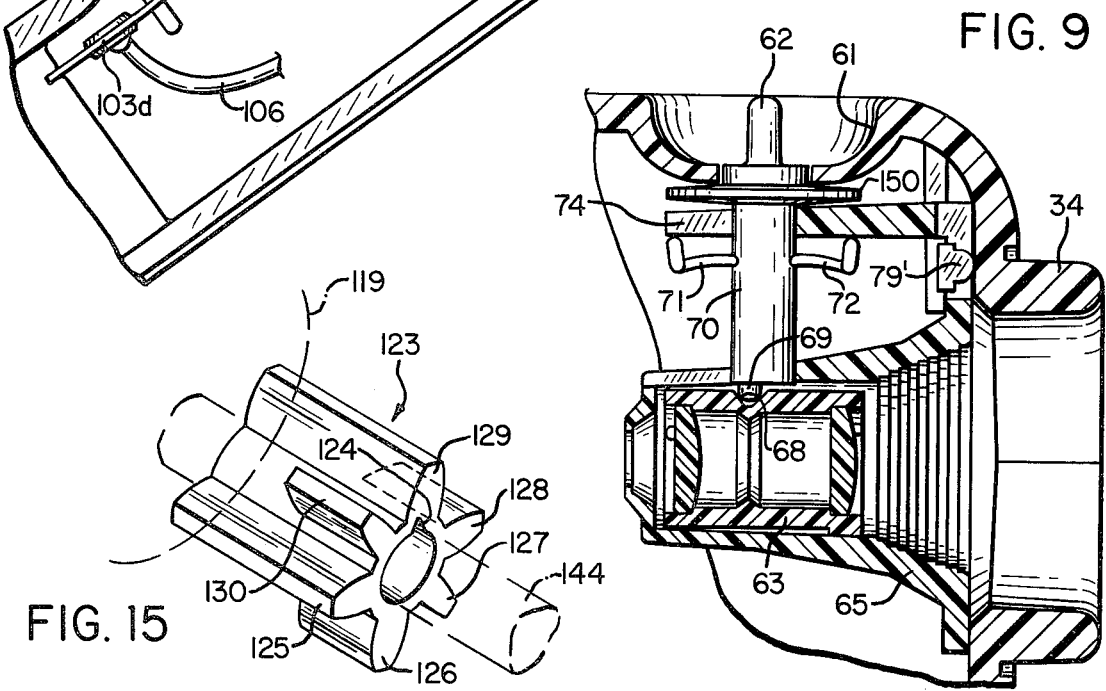
FIG. 9
FIG. 15

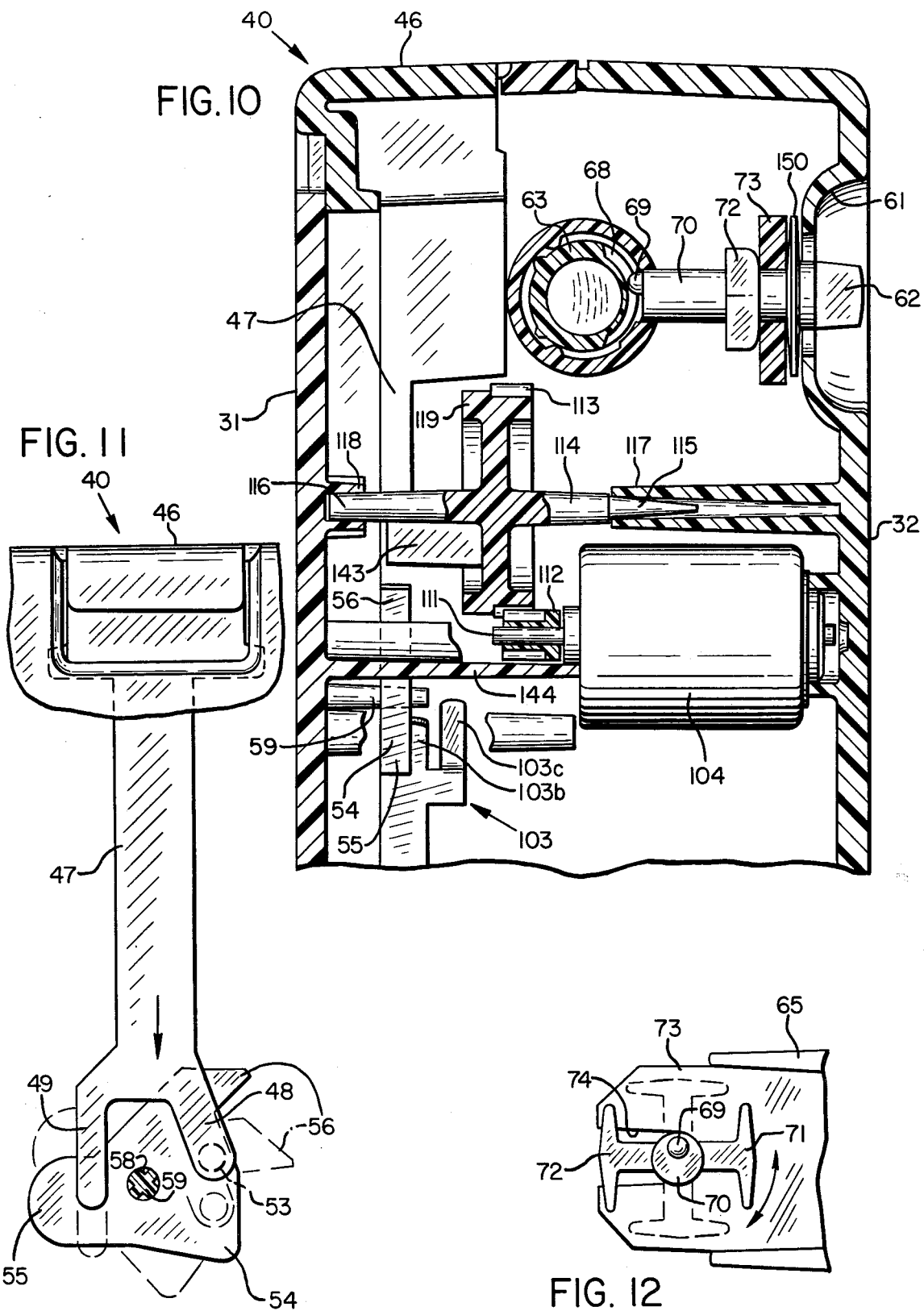

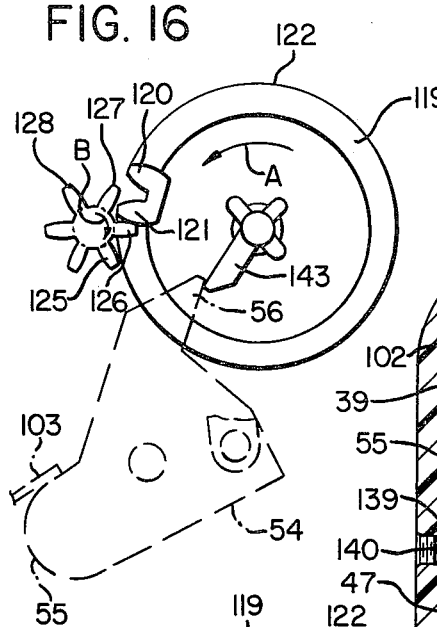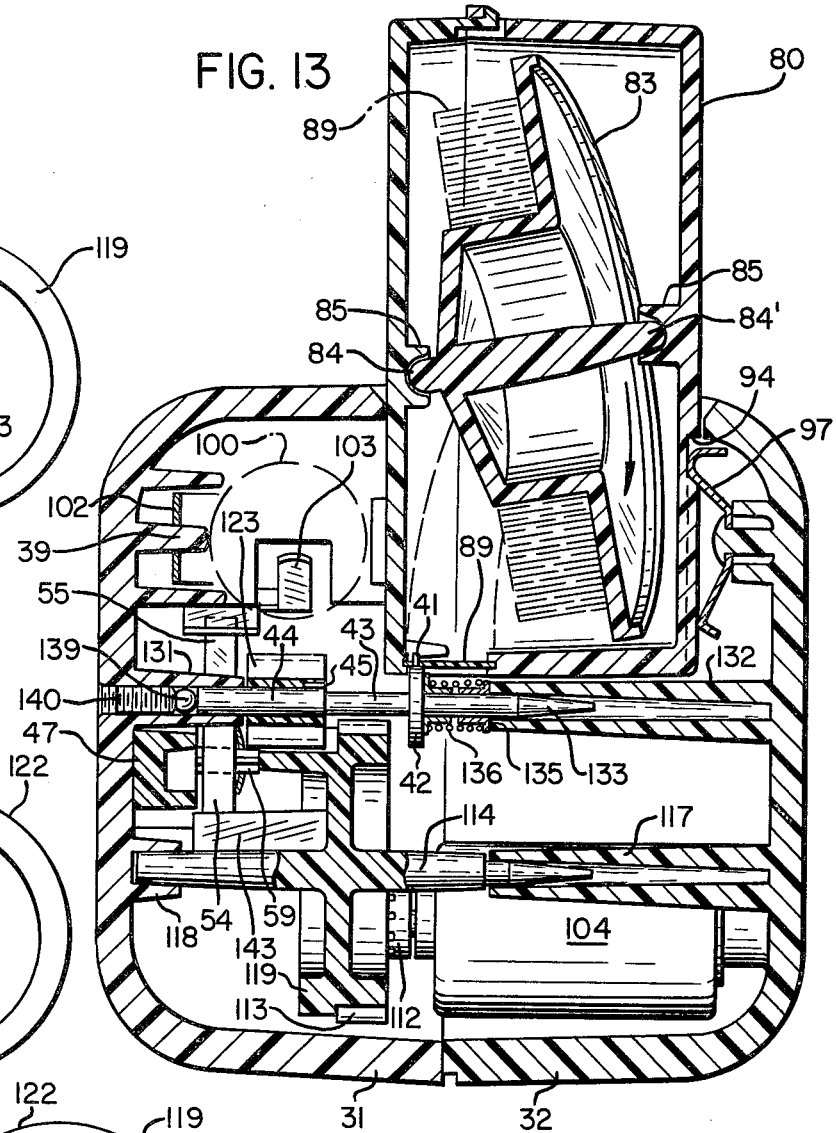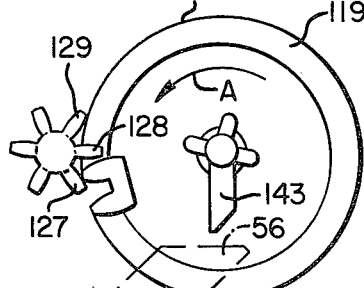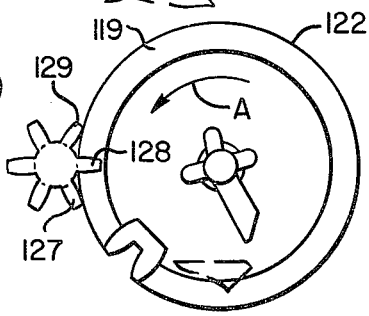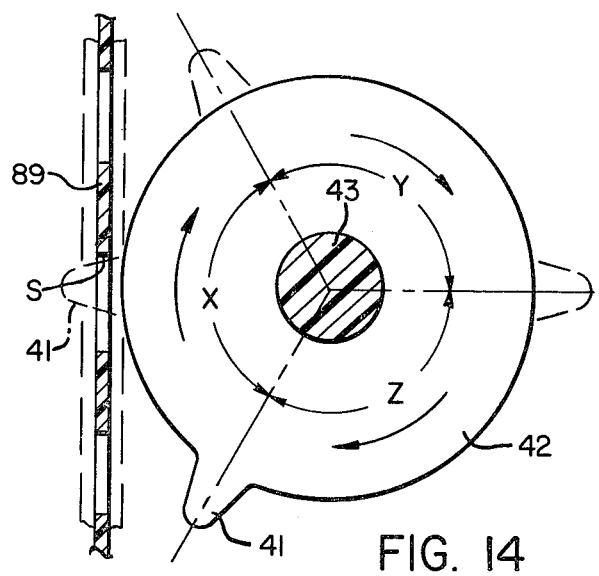

HAND HELD MOTION PICTURE VIEWER

BACKGROUND OF THE INVENTION

The present invention relates generally to motion picture or movie film devices and more particularly to a hand held motion picture viewing device which is adapted for viewing motion pictures from a film strip housed within a cartridge.

Hand held motion picture viewers adapted for viewing the images on successive frames of a film strip carried within a film cartridge are of course well known in the art. Typical viewers and cartridges of this type are shown for example in U.S. Pat. No. 3,306,697 to Nemeth and in U.S. Pat. Nos. 3,706,439 and 3,817,610 to Skinner et al. The viewers shown in these patents are of the manually operable type in which the film carried within the cartridge is advanced past a viewing aperture in the cartridge as a result of either a pawl engaging the perforations of the film or a sprocket wheel engaging the perforations of the film, each of which are coupled with and driven by a crank mechanism carried on the outside of the viewer manually operated by the user.

To avoid the use of a shutter mechanism the film must be moved to each succeeding frame fast enough so that film motion will not be detected by the person viewing the images. Typical prior art devices require either some type of film stopping mechanism or pawl and cam film engaging device for intermittent film motion.

The hand crank devices, whether with the cam and pawl drive, or in combination with the stop mechanism for intermittently moving the film, has a number of disadvantages. One such notable disadvantage is that these types of mechanisms are noisy when used. Additionally, the use of a manually operated drive mechanism has the disadvantage that film viewing speed is rarely constant. Operation of the hand crank can also be both tiresome and frustrating for certain individuals (particularly small children) who may have problems with eye and/or hand coordination.

The use of motorized drive mechanisms in hand held motion picture viewers for advancing the film carried within the cartridge is also well known in the art. One example of such a viewer is found in German Published Applications Nos. 26 04 770, 26 04 771 and 26 04 772. In this known viewer, a motor is used to drive an output shaft which, through a gear reduction transmission is coupled to a drive tooth which continuously rotates for engaging a film sprocket upon each revolution. While this and other known motorized movie viewers obviates the need for a hand crank thus avoiding the disadvantages connected therewith, such motorized viewers have other disadvantages, such as film slowdown when the battery reaches the end of its useful life and becomes weak, the inability to drive the film at a sufficiently low speed to minimize the size of the cartridge for maximum film viewing time, and inability to advance the film sufficiently fast to avoid detection of film motion.

It is accordingly one object of the present invention to provide a hand held motorized motion picture viewer which overcomes many of the disadvantages of the prior art.

A more specific object of the present invention is to provide a hand held motorized motion picture viewer which has a drive mechanism capable of intermittently advancing the film at speeds as low as 6 frames a second to maximize viewing time of the film carried within the cartridge.

A further specific object of the invention is to provide a hand held motorized movie viewer which includes a film driving claw for engaging and advancing the film in a cartridge which is driven in discrete arcuate steps.

Another object of the present invention is to provide a motion picture viewer which is battery operated but which avoids the undesirable effects of worn and weak batteries.

Yet a further object of the present invention is to provide a viewer with means for maximizing the viewing time available for viewing a film strip carried within a cartridge.

A still further object of the present invention is to provide a viewer and cartridge of the type in which the film is driven by a battery operated motor which is easy to use, minimizes eye discomfort, is relatively noiseless, and is relatively inexpensive to manufacture.

Other objects, features and advantages of the present invention will become more apparent from the detailed description of the invention in connection with the drawings to be described more fully hereinafter.

SUMMARY OF THE INVENTION

The foregoing objects are generally accomplished by providing a hand held motion picture viewer which includes a housing, a recess formed in one end of the housing for receiving a film cartridge, a viewing aperture in an opposite end of the housing through which images on the film within the cartridge can be viewed when the cartridge is positioned within the recess, and film driving means carried within the housing for engaging and advancing the film past the viewing aperture. The film driving means comprises a battery operated motor mounted within the housing, means for supporting a battery within the housing, actuating means for selectively connecting the motor with the battery for selective energization of the motor, a claw journaled for rotation within the housing and positioned to engage sprocket holes in the film of the cartridge when the cartridge is in the recess, and a gear transmission means connected between the motor and the claw for rotating the claw in discrete arcuate steps when the motor is energized for intermittent film advance.

In the preferred embodiment of the invention, the gear transmission means includes a drive pinion carried on the output shaft of the motor for rotation with the motor shaft, a gear reduction means coupled with the pinion, a two gear segment driven by the gear reduction means, a staggered tooth pinion gear driven in discrete 120° arcuate steps by the two tooth gear segment, and a claw advancing shaft keyed for rotation with the staggered tooth pinion gear and carrying the claw for intermittent rotation with the staggered tooth pinion in discrete 120° steps.

The actuating means for selective energization of the motor preferably includes an actuating lever mounted on the housing for longitudinal movement between a first position and a second position in which the battery is electrically connected with the motor. A contact cam is coupled with the actuating lever for pivotal movement upon longitudinal movement of the actuating lever to the second position. The contact cam carries a cam lobe for engaging a spring contact to move the spring contact into electrical contact with a terminal of the battery for completing an electrical circuit to the motor. Upon release of the actuating lever, the spring action of the spring contact will operate on the cam lobe of the contact cam to return the actuating lever to the first position.

In a further embodiment of the invention, the contact cam carries a pawl which is mechanically linked to the two tooth gear segment for mechanically driving the claw upon longitudinal movement of the actuating lever from the first to the second position to assist the claw in overcoming the inertia of the film when the motor is de-energized with the claw positioned in a sprocket hole of the film.

The viewer of the present invention also includes a lens assembly carried within the viewing aperture and means for causing focusing and framing adjustment of the lens assembly.

BRIEF DESCRIPTION OF THE DRAWINGS

The embodiments of the invention will be described in connection with the following drawings annexed hereto, in which:

FIG. 1 is a perspective view of the viewer of the present invention with a cartridge carried therein for viewing the film contained within the cartridge;

FIG. 2 is a perspective view of a film cartridge for use in the viewer of the present invention;

FIG. 3 is a right side elevational view of the viewer and cartridge shown in FIG. 1;

FIG. 4 is a top plan view of the viewer and cartridge shown in FIG. 1;

FIG. 5 is a front elevational view of the viewer and cartridge shown in FIG. 1;

FIG. 6 is a left side elevational view of the viewer and cartridge shown in FIG. 1;

FIG. 7 is an exploded perspective view of the viewer and cartridge shown in FIG. 1 illustrating each of the various elements thereof;

FIG. 8 is a longitudinal sectional view of the viewer with the left side of the housing removed;

FIG. 9 is a sectional view taken along lines IX—IX of FIG. 8;

FIG. 10 is a sectional view taken along lines X—X of FIG. 8;

FIG. 11 is an elevational view illustrating the action of the actuating lever and the contact cam;

FIG. 12 is an elevational view illustrating a detail of the framing and focusing mechanism of the present invention;

FIG. 13 is a sectional view taken along lines XIII—XIII in FIG. 6;

FIG. 14 is a view illustrating various rotational positions of the drive claw with respect to the film carried within the cartridge;

FIG. 15 is a perspective view of a staggered tooth gear used in the drive mechanism of the present invention;

FIGS. 16, 17, 18 and 19 are elevational views illustrating various positions of the staggered tooth gear with respect to the transfer gear;

DESCRIPTION OF THE INVENTION

Figure 21:
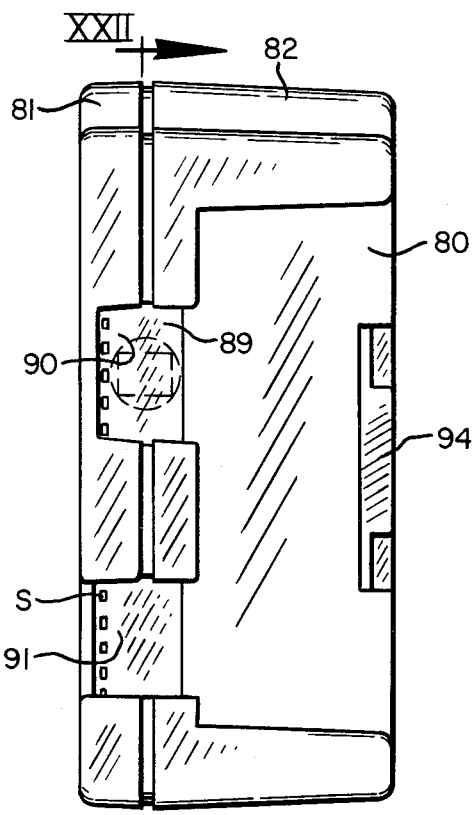
FIG. 21 is a front elevational view of the cartridge.
Figure 20:
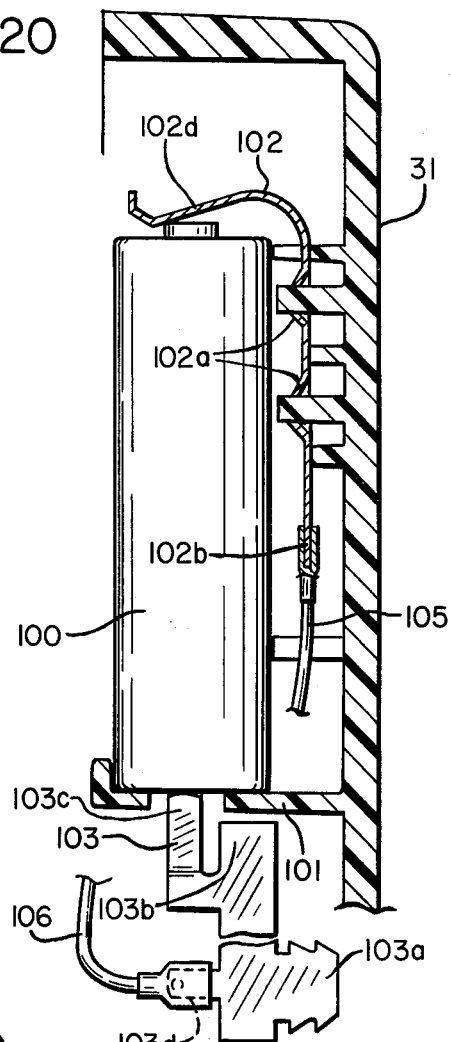
FIG. 20 is a sectional view of one-half of the viewer illustrating the position of the battery carried therein.

Referring now in more detail to the accompanying drawings, FIGS. 1-6 illustrate in various views the hand held viewer, generally indicated as reference numeral 30 and the cartridge, generally indicated as reference numeral 80 for use therewith. The viewer 30 is assembled from a pair of molded housing halves 31 and 32. Molded housing half 31 carries locating male pins 23, 24, 25, 26, 27, and 28 for mating engagement with female sockets 29 on housing half 32 to secure the molded housing halves together. When assembled, the housing halves form a recess 33 for receiving the film cartridge 80. An eyepiece 34 is formed by molded curved portions of the housing halves 31 and 32 to provide a viewing aperture 35 through which the user will view the film contained in the film cartridge 80.

An actuating lever 40 is provided on one side of the housing for initiating operation of the drive mechanism, to be described more fully hereinafter, for driving the film in the cartridge past the viewing aperture.

A viewing lens assembly 60, described further hereinbelow, is carried within the viewing aperture 35 for viewing an enlarged virtual image of the film. A knob 62 carried on the side of the housing opposite the actuating lever is used to effect focusing and/or framing adjustment of the lens assembly. A slot 61 is provided in the housing half 32 through which the knob 62 extends to effect desired focusing or framing adjustment.

The housing halves 31 and 32 are contoured so as to provide a handle 36 for easy gripping by the user. Accordingly, the user will hold the viewer by the handle 36 in one hand and will position the viewer for viewing through the eyepiece. The other hand of the user will be free for manipulating the actuating lever 40 to advance the film in the cartridge for motion picture viewing, or if focusing or framing adjustment is desired, the user will also be able to manipulate the knob 62 for desired adjustment. It will be obvious to those skilled in the art that the actuating lever 40 could be repositioned for actuation by the thumb or index finger of the hand on the handle. Such repositioning of parts is herein contemplated in the present invention.

The cartridge 80 is generally of known structure and forms no part of the present invention, but will be described for a clear understanding of the present invention. It includes a molded housing body 82 and a molded housing cover 81 which fit together in a known manner to enclose an endless loop of film 89 (see the exploded view of the cartridge in FIG. 7). The loop of film 89 is carried on a support plate 83 which is rotatably supported on spindles 84 and 84' between the cartridge housing cover 81 and body 82 in spindle sockets 85. A plurality of web projections 86 carried on the inside of the cartridge housing cover 81 are provided to properly guide and support the film to a position between a film guiding plate 87 and the front wall 88. The film is thus supported between the plate 87 and the front wall 88 for movement past a film aperture 90 which is aligned with the viewing aperture 35 when the cartridge is carried within the recess 33 in the viewer, and past a film driving aperture 91 which provides access to the perforations S on the edge of the film for engagement by a film driving claw to be described more fully hereinafter.

The cartridge body 82 further includes a recess for engagement by a spring 97 secured to the inside of the housing half 32 to securely position the cartridge within the housing. Recesses 92 and 93 facilitate assembly of the cartridge.

The cartridge has an additional depression 95 in the side wall of the cartridge housing cover 81, as described more fully in copending application, Ser. No. 873,715, in order to provide means for illuminating the film as it passes the film aperture 90 when the cartridge is used in a motion picture projector.

When the cartridge 80 is positioned within the recess 33 of the viewer for viewing operation, the aperture 91 will be positioned adjacent a claw 41 carried on the peripheral edge of a claw disc 42. (See FIG. 22) The claw disc is secured to a claw advance shaft 43 for rotation therewith. The claw advance shaft 43 has a portion 44 of enlarged diameter which carries a key 45 (See FIGS. 7 and 13). The enlarged portion 44 of the claw advance shaft 43 is rotatably coupled by the key 45 with the claw driving mechanism for rotatably driving the claw 41. When the claw 41 is rotatably driven, it will engage perforations S on the film 89 through the aperture 91 to intermittently advance the film.

The motorized mechanism for driving the claw, as can be seen and appreciated from FIGS. 7, 8 and 13-22, includes a battery 100 supported in a battery cradle 101 integrally formed as molded flanges in housing 31 for supporting the battery between a stationary contact 102 and a movable contact 103. Stationary contact 102 is fixed to the housing half 31 along its long leg 102a on housing projections 38 and 39. Its short leg 102d is for permanent electrical contact with one of the battery terminals. Movable contact 103 (made of leaf spring material) is fixed to the housing half 31 by connector 103a and has a movable cam follower leg 103b and a battery contact leg 103c for selective contact with the other battery terminal upon depression of actuating lever 40. A DC motor 104 is supported in the molded housing half 31, as illustrated in FIG. 10. Projections 108, 109 and 110 extend interiorly of the housings 31 and 32 to define the position of the motor 104. The motor has a first lead 105 for connection to the stationary contact 102 on stud 102b and a second lead 106 for connection with the movable contact 103 on stud 103d.

Motor 104 has an output shaft 111 which carries a drive pinion 112. An arcuately shaped section 144 molded into housing half 31 partially surrounds pinion 112 to support the motor. The motor 104 is preferably of the type which operates its output shaft and the pinion gear 112 carried thereon at 6480 rpm. A spur gear 113 is carried for rotation on a spindle 114. The spindle 114 has a first end 115 and a second end 116 which are journaled in inwardly extending sockets 117 and 118 integrally molded into the housing halves 32 and 31 respectively. Because of the gear ratio between the pinion 112 and the spur gear 113, spur gear 113 will rotate at 1080 rpm. A transfer gear 119 is fastened or otherwise secured to the spur gear 113 for rotation with the spur gear. The transfer gear may alternately be integrally molded with the spur gear 113. The transfer gear 119 has only two teeth 120 and 121, the remainder of transfer gear 119 has an arcuate peripheral surface 122 of a diameter substantially equal to the outside diameter of teeth 120 and 121.

A staggered tooth pinion gear 123 is supported on the enlarged portion 44 of the claw advance shaft 43 and has an internal keyway 124 (See FIG. 15) thereby keying the rotation of the claw advance shaft 43 to pinion gear 123. In this manner, the claw 41 and its claw disc 42 are driven by the motor 104 through the pinion 112, spur gear 113, transfer gear 119 and staggered tooth pinion gear 123. An arcuately shaped section 145 molded into housing half 31 partially surrounds pinion gear 123, as a guard against foreign bodies interfering with the film advance mechanism.

As can be more fully appreciated from FIG. 15, the staggered tooth pinion 123 has two sets of teeth. The first set are long teeth 125, 127 and 129 which axially extend the entire length of the gear. The second set includes short teeth 126, 128 and 130 interposed between each of the long teeth and which axially extend only part of the way of the gear. The short teeth are therefore staggered between the long teeth.

Claw advance shaft 43 is mounted for rotation between a pair of inwardly extending molded sockets 131 and 132 on housing halves 31 and 32 respectively. For this purpose, claw advance shaft 43 has a first spindle end 133 which is tapered and which is journaled in the socket 132. Spindle end 134 on the enlarged portion 44 of the shaft 43 is journaled in the socket 131. Between the inwardly extended end 135 of the socket 132 and the claw disc 42 is interposed a compression spring 136 for urging the claw disc 42 in a direction to the left when viewing FIG. 13. To minimize any drag on the rotation of the shaft 43, a pair of sleeves 137 and 138 which have radial flanges are carried on the shaft 143 to support the spring 136 between the flanges. A ball 139 acts as a bearing between the end 134 of shaft 43 and an adjustment set screw 140 threadedly engaged with the socket 131. Rotation of the adjustment set screw 140 will exert an axial force on the shaft 43 through ball 139 to axially adjust the position of the claw disc 42, against the pressure of the spring 136. This type of fine adjustment is required to properly position the claw disc 42 for alignment and engagement with the sprocket holes S in the film 89. Such adjustment is typically required since the tolerances in positioning the film within the cartridge are not precise.

Energization of motor 104 will therefore drive pinion 112 to cause rotation of spur gear 113 at 1080 rpm. Because transfer gear 119, which is driven with the spur gear 113, has only two teeth 120 and 121, it will engage and drive pinion gear 123 only as the two teeth complete each revolution of the transfer gear. One of the long teeth 125, 127 or 129 will accordingly be positioned between the two teeth 120 and 121 of the transfer gear causing rotation of the pinion and consequent rotation of the claw advance shaft 143, the claw disc 42 and the claw 41 which will engage one of the sprockets in the film 89 to drive the film past the viewing aperture 90 in the cartridge.

FIGS. 16, 17, 18 and 19 illustrate the various stages of engagement of the two teeth of the transfer gear with the pinion 123. With transfer gear 119 driven in the direction of arrow A, tooth 121 on the transfer gear will first engage short tooth 126 radially extending in the path of the teeth 120 and 121 to drive the pinion 123 in the direction of arrow B. Long gear tooth 127 will be moved to the position between teeth 120 and 121, as shown in FIG. 17, and will then be engaged by gear 120 to rotate pinion 123 out of engagement with the two teeth 120 and 121, as shown in FIG. 18. As the transfer gear 119 continues to rotate in the direction of arrow A, long teeth 127 and 129 will be resting on the circumferential surface 122 of the transfer gear 119 to thus lock pinion 123 against further rotation until teeth 121 and 120 again complete a full revolution to engage the next short tooth 128 which is now extending radially inwardly in the path of the two teeth 120 and 121. Accordingly, the pinion gear 123 is rotated by a distance corresponding to two teeth upon each revolution of the transfer gear 119. The pinion gear 123 having six teeth is therefore rotated at a third of the speed of the transfer gear or 360 rpm. FIG. 14 illustrates that because the staggered tooth gear 123 can only rotate when the two tooth segment comprising teeth 120 and 121 on the transfer gear 119 completes a revolution, the pinion 123 will rotate intermittently in 120° steps X, Y and Z. Claw disc 42 will therefore also rotate with shaft 43 in 120° steps so that claw 41 will rotate at the rate of 360 rpm or six revolutions per second. Each time the claw 41 passes through the 120° step "X", it will engage a sprocket hole of the film 89 to drive it a distance of one frame. Accordingly, the film will be advanced six frames per second as a result of the claw disc 42 being rotated at the rate of six revolutions per second.

Because the claw 41 rotates in three discrete 120° steps (i.e. it is completely stationary during the period of time that the two teeth 120 and 121 are not engaged with any of the teeth of the pinion 123) true intermittent motion of the film is achieved. Also, because the claw 41 is only in engagement with a sprocket hole S of the film 89 during a portion of the 120° movement, the film will be advanced in 0.003 seconds which is sufficiently fast, no shutter mechanism is required. Additionally, because the film is being advanced at only six frames per second, a significantly greater viewing time is permitted so that a greater amount of information can be carried on the film and viewed in the same period of time as is possible in presently known viewers.

To energize motor 104, actuating lever 40 has a top flat surface 46 for application of finger pressure, a shank portion 47 and a bifurcated end with legs 48 and 49. Together with guide plate 50, the shank portion 47 is engaged by guide walls 51 and 52 to constrain movement of the actuating lever to longitudinal movement. When assembled in the housing half 31, legs 48 and 49 will straddle an inwardly extending shaft 59 molded into the housing half 31. A pin 53 is carried on the distal end of leg 48. A contact cam 54 is coupled with the actuating lever 40 by pin 53 extending through pinhole 57. The contact cam 54 is carried for pivotal movement on the shaft 59 through aperture 58. The contact cam 54 has a cam lobe 55 arranged for engagement with cam follower leg 103b of the movable contact 103. Contact cam 54 also carries a pawl 56, the operation of which will be described further hereinbelow. Leg 49 serves to guide and support the contact cam 54 during pivotal movement. Without the leg 49, a certain degree of tilting movement of the contact cam on the shaft 59 could be expected.

In operation, depression of actuating lever 40 will cause contact cam 54 to pivot about shaft 59 as a result of coupling through pin 53 and hole 57. It will be appreciated that actuating lever 40 can only move in a longitudinal direction. Accordingly, pin 53 will also move only in a direction parallel to the longitudinal axis of lever 40 causing the desired pivotal movement of the contact cam 54 about the shaft 59, as illustrated in FIG. 11. Upon pivotal movement of the contact cam, as illustrated in FIG. 8, the contact cam 54 will rotate in the direction of arrow C from the solid line position to the dash line position. Thus contact 103 will be moved from the solid line position to the dash line position in which the contact leg 103c engages the battery to complete the electrical circuit through the battery terminals, contacts 102 and 103, and leads 105 and 106 to the motor 104 for energization of the motor. Movable contact 103 will remain in contact with its battery terminal as long as actuating lever 40 is depressed. Upon release, however, of the actuating lever, the spring action of contact 103 will push against lobe 55 of the contact cam 54 urging the cam to rotate about the shaft 59 in a direction opposite to arrow C causing actuating lever 40 to return to its initial non-depressed position.

When the energy in the battery becomes depleted, its electrical output decreases. If the claw 41 were to be positioned within a sprocket hole S of the film at the instant the motor is de-energized, by release of the actuating lever 40, it may be difficult if not impossible to drive motor 104 with a worn or weak battery. This results because it will be necessary for the battery to produce sufficient electrical energy to overcome the inertia of the stationary film as well as the stationary claw. However, if the claw were not positioned within a sprocket hole of the film the battery may still be sufficiently powerful to drive the motor since it will not have to overcome the inertia of the stationary film. Transfer gear 119 therefore carries a start lever 143 which is engaged by pawl 56 on contact cam 54 when the contact cam 54 is pivoted about shaft 59 as a result of longitudinal movement of actuating lever 40. Pawl 56 is sufficiently long so as to remain in contact with start lever 143 for a period of time to rotate transfer gear 119 an amount sufficient to cause the teeth 120 and 121 to engage the pinion 123 and cause rotation thereof to mechanically assist the claw 41 to overcome any inertia of a stationary film. This arrangement greatly increases the usefull life of the battery.

The operation of pawl 56 and start lever 143 is more fully appreciated from FIGS. 16–19. It will be seen from FIG. 16 that pawl 56 will engage start lever 143 at the point when tooth 121 of the transfer gear is in a position to contact short tooth 126 of the pinion 123. FIG. 17 illustrates that upon further movement of the pawl 56, transfer gear 119 will have been rotated to a point where long tooth 127 is positioned between teeth 120 and 121 and where pinion 123 has been partially rotated. FIG. 18 illustrates the position of the pawl 56 after actuating lever 40 has been completely depressed and in which position the pinion 123 is locked against further rotation by teeth 127 and 129 riding on the peripheral surface 122 of the transfer gear. Upon subsequent rotation of the transfer gear 119 caused by motor driven pinion 112, pawl 56 will have been pivoted to such a position as not to interfere with continued rotation of the start lever 143.

Turning now to the lens assembly 60 and viewing aperture 35, the lens assembly includes a lens barrel 63 with a pair of lenses 64 and 64' having a focal length adjusted for focusing upon the film as it passes the viewing aperture 90 of the cartridge when the cartridge is inserted in the recess 33. The lens barrel 63 is carried in a barrel housing 65 which has a flat front face 66 for sliding engagement with the inside front surface of the housing halves 31 and 32. The barrel housing 65 has a bore 67 receiving the lens barrel 63 for axial movement to effect focusing adjustment. An arcuate slot 68 is formed on the outside circumferential surface of the lens barrel 63 and is engaged by an eccentrically mounted stud 69 on the end of knob shaft 70. When knob shaft 70 is rotated by turning knob 62, the eccentrically mounted stud 69 will exert a force on the lens barrel through the slot 68 causing the barrel to be axially moved within the bore 67 toward or away from the film in the cartridge. Shaft 70 also carries a pair of wings 71, 72 which engage the inside surface of a side wall 73 of the barrel housing 65 and a circular plate 150 on the other side of wall 73. Wings 71 and 72 thereby serve to place a small amount of drag against rotation of the shaft 70 to prevent inadvertent rotation of shaft 70 which would result in continuous requirement for focusing adjustment. A slot 74 is provided in the wall 73 to accommodate the shaft 70. Focusing adjustment is thereby effected by rotating shaft 70 through the use of knob 62.

Lens barrel housing 65 also includes upper and lower flanges 75 and 75' which are positioned between the front wall of the housing halves of the viewer and guide walls 76, 76' respectively for guiding the lens assembly in a direction parallel to the path of the film moving past the apertures 90 and 91 to effect framing adjustment. Framing adjustment is easily accomplished by vertically moving the knob 62 in the slot 61 to thereby exert a force on either the upper or lower surfaces of the slot 74 causing the assembly to slide against the inside surface of the front wall of the viewer. Flanges 75 and 75' serve to guide the barrel housing in a direction parallel to the film path between the guide walls 76, 76' and the inside surface of the front wall.

The barrel housing 65 also has cutouts 77, 77' producing spring fingers 78, 78' which engage the inside surface of the side of housing half 31 to urge the lens barrel housing into proper alignment position with the viewing aperture 35. Finally, the barrel housing 65 has a recess 79 and a detent 79' carried in the recess which engages the inside surface of the front wall to exert a small amount of drag against vertical movement. The force exerted by the detent 79' against the inside front surface of the front wall therefore has to be overcome by movement of the knob 62. Otherwise, the lens assembly would require constant framing adjustment.

Figure 22:
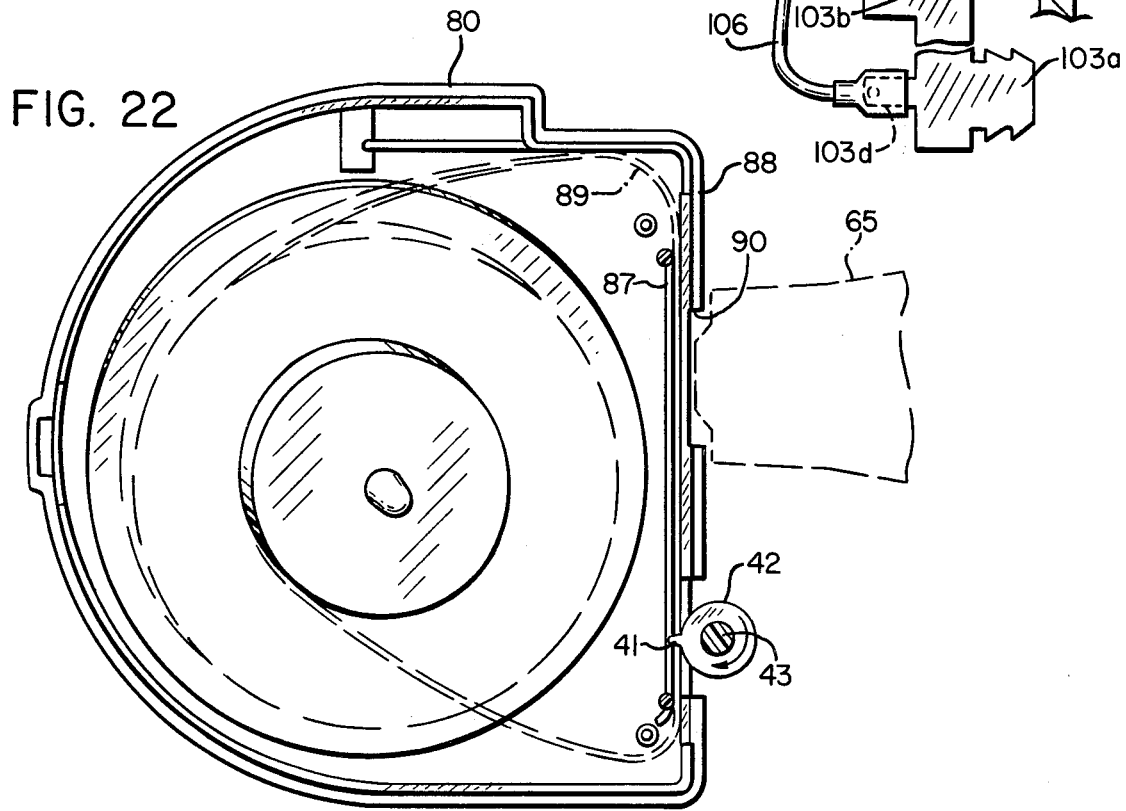
FIG. 22 is a sectional view taken along lines XXII—XXII in FIG. 21.

It will be noted in FIG. 22 that when the cartridge 30 is positioned within the recess 33 of the viewer, the lens barrel housing 65 is aligned with the viewing aperture 90. Accordingly, the viewing aperture 35 of the viewer is aligned with the aperture 90 in the cartridge so that the film passing the viewing aperture can be seen.

The knob 62 extending through the slot 61 can therefore be used to either effect focusing adjustment by rotating the knob 62 which causes rotation of shaft 70 and thereby axial adjustment of the lens barrel 63 within the bore 67, or for framing adjustment by movement of the knob 62 which causes repositioning of the barrel housing 65.

While the present invention has been described and illustrated with respect to a certain preferred embodiment which produces satisfactory results, it will be appreciated by those skilled in the art after understanding the purposes of the invention, that various changes and modifications may be made without departing from the spirit and scope of the invention, and it it therefore intended to cover all such changes and modifications in the appended claims.

What is claimed is:

1. A hand held motion picture viewer comprising:
   a housing;
   a recess formed in one end of said housing for receiving therein a film cartridge containing an endless loop of film and having a film driving opening, a viewing opening, and means for guiding said film past said driving and viewing openings;
   a viewing aperture in an opposite end of said housing aligned with said viewing opening of said cartridge and through which images on said film can be viewed when said cartridge is positioned within said recess; and
   a battery operated motor mounted in said housing:
   means for supporting a battery within said housing;
   actuating means for selectively establishing electrical connection between said motor and a battery supported in the housing for selective energization of said motor;
   a claw journaled for rotation within said housing and positioned to engage sprocket holes in said film through said driving opening when said cartridge is in said recess; and
   a gear transmission means connected between said motor and said claw for rotating said claw in discrete arcuate steps when said motor is energized for intermmittent film advance wherein said gear transmission means has;
   a drive pinion carried on the output shaft of said motor for rotation therewith;
   gear reduction means coupled with said pinion;
   a gear segment driven by said gear reduction means;
   a staggered tooth pinion gear having three axial short teeth interposed between three axial long teeth intermittently driven in 120° discrete arcuate steps by said gear segment;
   a claw advance shaft journaled for rotation within said housing and keyed for rotation in 120° discrete steps with said staggered tooth pinion gear;
   a claw disc carried on said claw advance shaft for rotation therewith;
   said claw being carried on a peripheral surface of said claw disc.

2. The hand held motion picture viewer according to claim 1 wherein said gear reduction means comprises a spur gear journaled for rotation within said housing, and wherein said gear segment comprises a two tooth gear connected with and driven by said spur gear, whereby said staggered tooth spur gear is driven at one-third the speed of said two tooth gear segment.

3. The hand held motion picture viewer according to claim 1 wherein said actuating means comprises an actuating lever mounted for longitudinal movement between a first position and a second position, a contact cam coupled with said actuating lever and mounted for pivotal movement upon longitudinal movement of said actuating lever, spring contact means engageable by said contact cam for movement into electrical contact with said battery for energizing said motor upon movement of said actuating lever from said first to said second positions, a pawl carried by said contact cam for pivotal movement therewith, a start lever connected with said gear segment and extending in the path of pivotal movement of said pawl, whereby upon longitudinal movement of said actuating lever from said first to said second positions said pawl will engage said start lever to cause rotational movement of said gear segment, said staggered tooth pinion gear and said claw disc to advance said claw through a short angular distance to assist in overcoming inertia of the film carried within said cartridge.

4. A hand held motion picture viewer comprising:
   a housing;
   a recess formed in one end of said housing for receiving therein a film cartridge containing an endless loop of film and having a film driving opening, a viewing opening, and means for guiding said film past said driving and viewing openings;

film driving means carried within said housing for engaging and advancing said film past said viewing opening, comprising:

a battery operated motor mounted in said housing;

means for supporting a battery within sad housing;

actuating means for selectively establishing electrical connection between said motor and a battery supported in the housing for selective energization of said motor;

a claw journaled for rotation within said housing and positioned to engage sprocket holes in said film through said driving opening when said cartridge is in said recess; and a gear reduction assembly driven by said motor and a step motion gear assembly driven by said gear reduction assembly in discrete 120° steps said gear reduction has a pinion gear carried on the output shaft of said motor for rotation therewith, and a spur gear journaled for rotation within said housing, said spur gear rotating at one-sixth the speed of said pinion gear, said step motion gear assembly being connected to a claw advancing shaft which carries said claw for driving said claw in discrete 120° steps and has a transfer gear connected with said spur gear for rotation therewith, said transfer gear having a two tooth gear segment, and a staggered tooth pinion gear having three axial short teeth interposed between three axial long teeth, whereby said staggered tooth pinion gear is driven by said two tooth pinion gear at one third the speed of said transfer gear.

5. The hand held motion picture viewer according to claim 4 further comprising a claw advance shaft journaled for rotation within said housing, a claw disc supported on said claw advance shaft for rotation therewith, said claw being carried on a peripheral surface of said claw disc, keying means for coupling said staggered tooth pinion gear with said claw advance shaft for causing rotation of said claw advance shaft and said claw in discrete 120° steps.

6. The hand held motion picture viewer according to claim 5 wherein said claw advance shaft is carried for rotation between a pair of spindle sockets.

7. The hand held motion picture viewer according to claim 6 further comprising means for axially positioning and shifting said claw advance shaft so as to axially adjust the plane of rotation of said claw.

8. The hand held motion picture viewer according to claim 7 wherein said means for axially shifting said claw advance shaft comprises a ball bearing carried within one of said spindle sockets for engaging one end of said claw advance shaft, a threaded set screw carried for axial movement within said socket to exert an axial force on said claw advance shaft through said ball bearing when said set screw is rotated within said socket, and spring means acting on said claw disc for biasing said claw advance shaft against said ball bearing.

9. A hand held motion picture viewer comprising:
a housing;
a recess formed in one end of said housing for receiving therein a film cartridge containing an endless loop of film and having a film driving opening, a viewing opening, and means for guiding said film past said driving and viewing openings;
a viewing aperture in an opposite end of said housing aligned with said viewing opening of said cartridge and through which images on said film can be viewed when said cartridge is positioned within said recess;

film driving means carried within said housing for engaging and advancing said film past said viewing opening, comprising:
a battery operated motor mounted in said housing;
means for supporting a battery within said housing;
a claw journaled for rotation within said housing and positioned to engage sprocket holes in said film through said driving opening when said cartridge is in said recess;
gear transmission means connected between said motor and said claw for rotating said claw in discrete arcuate steps when said motor is energized for intermittent film advance; and
actuating means for selectively establishing electrical connection between said motor and a battery supported in said viewer housing for selective energization of said motor, comprising:
an actuating lever mounted for longitudinal movement between a first position and a second position in which said motor is in electrical contact with said battery;
a contact cam coupled with said actuating lever and mounted for pivotal movement upon longitudinal movement of said actuating lever between said first and second positions;
a cam lobe carried on said contact cam; and
spring contact means in engagement with said cam lobe for movement into and out of electrical contact with a terminal of said battery upon longitudinal movement of said actuating lever between said second and first positions respectively, said spring contact acting on said contact cam to urge said actuating lever into said first position.

10. The hand held motion picture viewer according to claim 9 wherein said spring contact means comprises a cam follower leg in engagement with said cam lobe, and a battery contact leg for selective engagement with a terminal of said battery.

11. The hand held motion picture viewer according to claim 10 wherein said actuating lever is provided with a pin extending in a direction perpendicular to the longitudinal axis of said actuating lever, said contact cam having an aperture for receiving said pin for coupling said actuating lever with said contact cam, said contact cam being mounted for pivotal movement about a point offset from said pin so that upon longitudinal movement of said actuating lever said pin will cause pivotal movement of said contact cam about said pivot point.

12. The hand held motion picture viewer according to claim 9 further comprising a pawl carried on said contact cam for pivotal movement with said contact cam upon longitudinal movement of said actuating lever between said first and second positions, a start lever connected with said gear transmission means and engageable by said pawl on said contact cam for causing advance of said film driving means upon longitudinal movement of said actuating lever from said first to said second positions.

13. The hand held motion picture viewer according to claim 1 further comprising means for mechanically rotating said claw through a short angular distance upon longitudinal movement of said actuating lever from said first to said second positions.

14. The hand held motion picture viewer according to claim 13 wherein said means for mechanically advancing said claw comprises a pawl carried by said contact cam for pivotal movement therewith upon longitudinal movement of said actuating lever, a start lever connected with said film driving means and engageable by said pawl causing advance of said film driving means upon movement of said actuating lever from said first to said second positions.

15. A hand held motion picture viewer comprising:
a housing;
a recess formed in one end of said housing for receiving therein a film cartridge containing an endless loop of film and having a film driving opening, a viewing opening, and means for guiding said film past said driving said viewing openings;
a viewing aperture in an opposite end of said housing aligned with said viewing opening of said cartridge and through which images on said film can be viewed when said cartridge is positioned within said recess;
film driving means carried within said housing for engaging and advancing said film past said viewing opening, comprising:
a battery operated motor mounted in said housing;
means for supporting a battery within said housing;
actuating means for selectively establishing electrical connection between said motor and battery supported in the housing for selective energization of said motor;
a claw journaled for rotation within said housing and positioned to engage sprocket holes in said film through said driving opening when said cartridge is in said recess; and
a gear transmission means connected between said motor and said claw for rotating said claw in discrete arcuate steps when said motor is energized for intermittent film advance; and
a lens assembly carried within said viewing aperture for effecting focusing and/or framing adjustment, comprising:
a lens barrel housing carried for sliding movement against the inside surface of the front wall of said housing in a direction parallel to the movement of said film past the viewing aperture in said cartridge;
a lens barrel carried for axial movement within said barrel housing, and
means coupled with said barrel housing extending through a side wall of said viewer housing for effecting axial movement of said lens barrel within said barrel housing to effect focusing adjustment thereof and for causing sliding movement of said lens barrel housing to effect framing adjustment for viewing the moving frames on said film.

16. The hand held motion picture viewer according to claim 15 wherein said means for causing axial movement of said lens barrel and sliding movement of said barrel housing comprises an arcuate slot in said lens barrel, a knob shaft extending through an opening in said barrel housing, an eccentrically mounted stud carried on one end of said knob shaft in engagement with said arcuate slot on said lens barrel, said knob shaft extending through a longitudinal slot in a side wall of said viewer housing, said longitudinal slot extending in a direction parallel to the path of said film, and a knob carried on the other end of said knob shaft externally of said viewer housing for causing rotation of said knob shaft to thereby cause axial movement of said lens barrel within said barrel housing and for exerting a force on said lens barrel in either of two directions parallel to the path of said film.

17. The hand held motion picture viewer according to claim 16 further comprising a pair of wings carried on diametrically opposite sides of said knob shaft for engaging a wall of said barrel housing creating a small amount of drag against rotational movement of said knob shaft.

18. The hand held motion picture viewer according to claim 16 further comprising means carried on said barrel housing for engaging the inside front wall surface of said viewer housing to create resistance against sliding movement thereof.

* * * * *